United States Patent
Johnson

(10) Patent No.: US 7,280,377 B2
(45) Date of Patent: Oct. 9, 2007

(54) POWER CONVERTER IN A UTILITY INTERACTIVE SYSTEM

(75) Inventor: James P. Johnson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/918,354

(22) Filed: Aug. 16, 2004

(65) Prior Publication Data

US 2006/0034106 A1 Feb. 16, 2006

(51) Int. Cl.
*H02M 7/5395* (2006.01)
*H02M 5/452* (2006.01)

(52) U.S. Cl. .............................. 363/97; 363/36; 363/98

(58) Field of Classification Search ................ 363/17, 363/34, 36, 37, 95–98, 131, 132
See application file for complete search history.

(56) References Cited

U.S. PATENT DOCUMENTS

| | | | |
|---|---|---|---|
| 4,281,374 A * | 7/1981 | Archer | 363/41 |
| 5,550,697 A | 8/1996 | Green et al. | |
| 6,043,996 A * | 3/2000 | Kumar | 363/41 |
| 6,134,127 A * | 10/2000 | Kirchberg | 363/41 |
| 6,239,997 B1* | 5/2001 | Deng | 363/95 |
| 6,560,130 B2* | 5/2003 | Oba et al. | 363/97 |
| 6,700,804 B1 | 3/2004 | Reichard | |
| 6,826,062 B2* | 11/2004 | Shinba | 363/40 |
| 7,183,667 B2* | 2/2007 | Colby et al. | 307/19 |
| 2006/0050458 A1* | 3/2006 | Johnson | 361/62 |

* cited by examiner

*Primary Examiner*—Gary L Laxton
(74) *Attorney, Agent, or Firm*—Finnegan, Henderson, Farabow, Garrett, & Dunn

(57) ABSTRACT

Consistent with an aspect of the present disclosure, a backup fuel cell, for example, is coupled to a utility power grid, through a power conversion circuit. The power conversion circuit may include an inverter circuit, pulse generating circuit and control circuit. The inverter circuit is configured to receive a DC signal and output a first AC signal, and the pulse generating circuit generates a pulse signal in response to a change in a parameter associated with a second utility generated AC signal. The control circuit is coupled to the inverter circuit, and is configured to receive the pulse signal. In addition, the control circuit supplies a control signal to the inverter circuit to adjust a parameter associated with the first AC signal in response to the pulse.

17 Claims, 12 Drawing Sheets

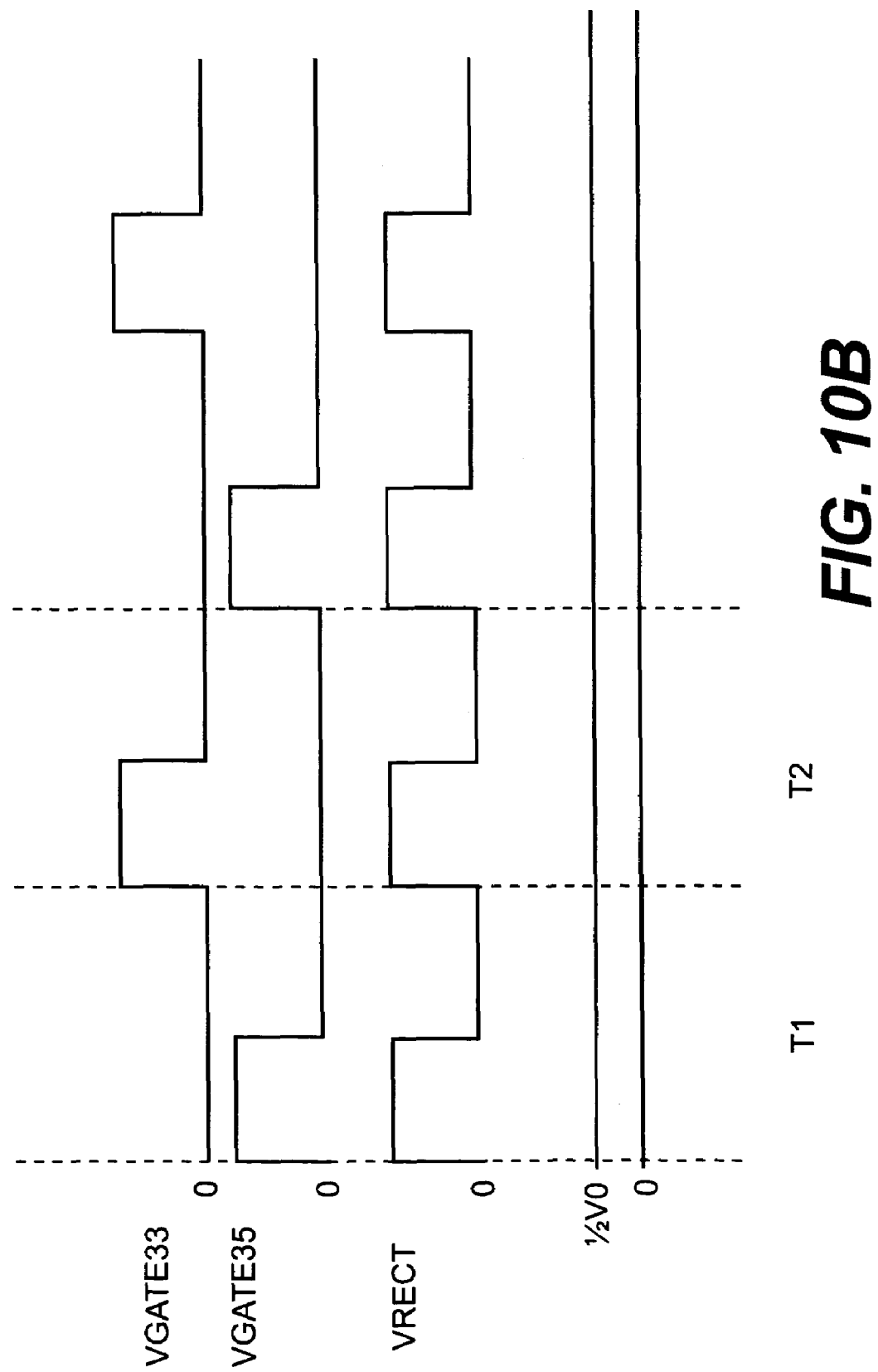

POWER CONVERTER IN A UTILITY INTERACTIVE SYSTEM

GOVERNMENT RIGHTS

This invention was made with United States Government support under Contract No. DE-FL04-02AL67623. The United States Government has certain rights in this invention.

TECHNICAL FIELD

The present disclosure is directed toward a power converter that converts a direct current (DC) signal to an alternating current (AC) signal and a related method for controlling and synchronizing the AC signal with a utility generated AC signal.

BACKGROUND

Backup power supplies are often used to supply power when a utility power grid is disabled. Internal combustion engine driven generators are often deployed as backup power supplies. These generators, however, are relatively large and noisy, and output toxic emissions.

Fuel cells are known to generate electrical power through chemical processes having relatively minimal emissions with little environmental impact. Accordingly, fuel cells have been explored as an attractive alternative to conventional backup generators. Unlike generators, however, fuel cells typically cannot be activated within a short period of time. Accordingly, in backup power applications, fuel cells often output electrical power continuously, regardless of whether the power grid is operational. In the event power is cut off, the fuel cell supplies backup power which can be distributed by the grid to critical components, or selected areas of the grid.

U.S. Pat. No. 6,700,804 describes a backup fuel cell coupled to a utility grid. The fuel cell supplies a DC voltage to an inverter, which, in turn, supplies an AC signal to a utility distribution system. However, the AC signal output from the inverter should be synchronized to the AC signal generated by the utility in order to assure compatibility with components connected to the distribution system. Moreover, the root mean square (rms) and phase of the AC inverter output relative to the utility AC signal should be controllable in order to maintain efficient power transmission, even when variations occur in the utility AC signal. Thus, a synchronizable and adjustable DC to AC conversion circuit is required to improve transmission characteristics.

The present disclosure is directed to overcome one or more of the shortcomings in the prior art.

SUMMARY OF THE INVENTION

Consistent with an aspect of the present disclosure, a power conversion circuit is provided which includes an inverter circuit, pulse generating circuit and control circuit. The inverter circuit is configured to receive a DC signal and output a first AC signal, and the pulse generating circuit generates a pulse signal in response to a change in a parameter associated with a second utility generated AC signal. The control circuit is coupled to the inverter circuit, and is configured to receive the pulse signal. In addition, the control circuit supplies a control signal to the inverter circuit to adjust a parameter associated with the first AC signal in response to the pulse signal.

Consistent with an additional aspect of the present disclosure, a method is provided for controlling an AC signal output from an inverter circuit. The method includes supplying a DC signal to the inverter circuit, and sensing the AC signal, the AC signal being output from the inverter circuit in response to the DC signal. The method also includes comparing a value of a parameter of the AC signal to a desired value, and adjusting the DC signal to thereby adjust the parameter of the AC signal.

In accordance with a further aspect of the present disclosure, a system for controlling an AC signal is provided including a DC-DC converter circuit, an inverter circuit, and a control circuit. The DC-DC converter circuit receives an input DC voltage and supplies an output DC voltage. The inverter circuit is configured to receive the output DC voltage, and generate the AC signal in response thereto. In addition, the control circuit is configured to supply control signals to the DC-DC converter circuit to thereby adjust a level of the output DC voltage.

In accordance with an additional aspect of the present disclosure, a power conversion circuit is provided including an inverter circuit, an inductor circuit, and a capacitor circuit. The inverter circuit is configured to receive a DC signal and output an AC signal. The inductor circuit is configured to control power flow associated with the AC signal. The inductor circuit and the capacitor circuit are configured to filter the AC signal.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIGS. 10A and 10B illustrate a timing diagram of signals in connection with a DC-DC conversion circuit shown in FIGS. 1 and 2.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
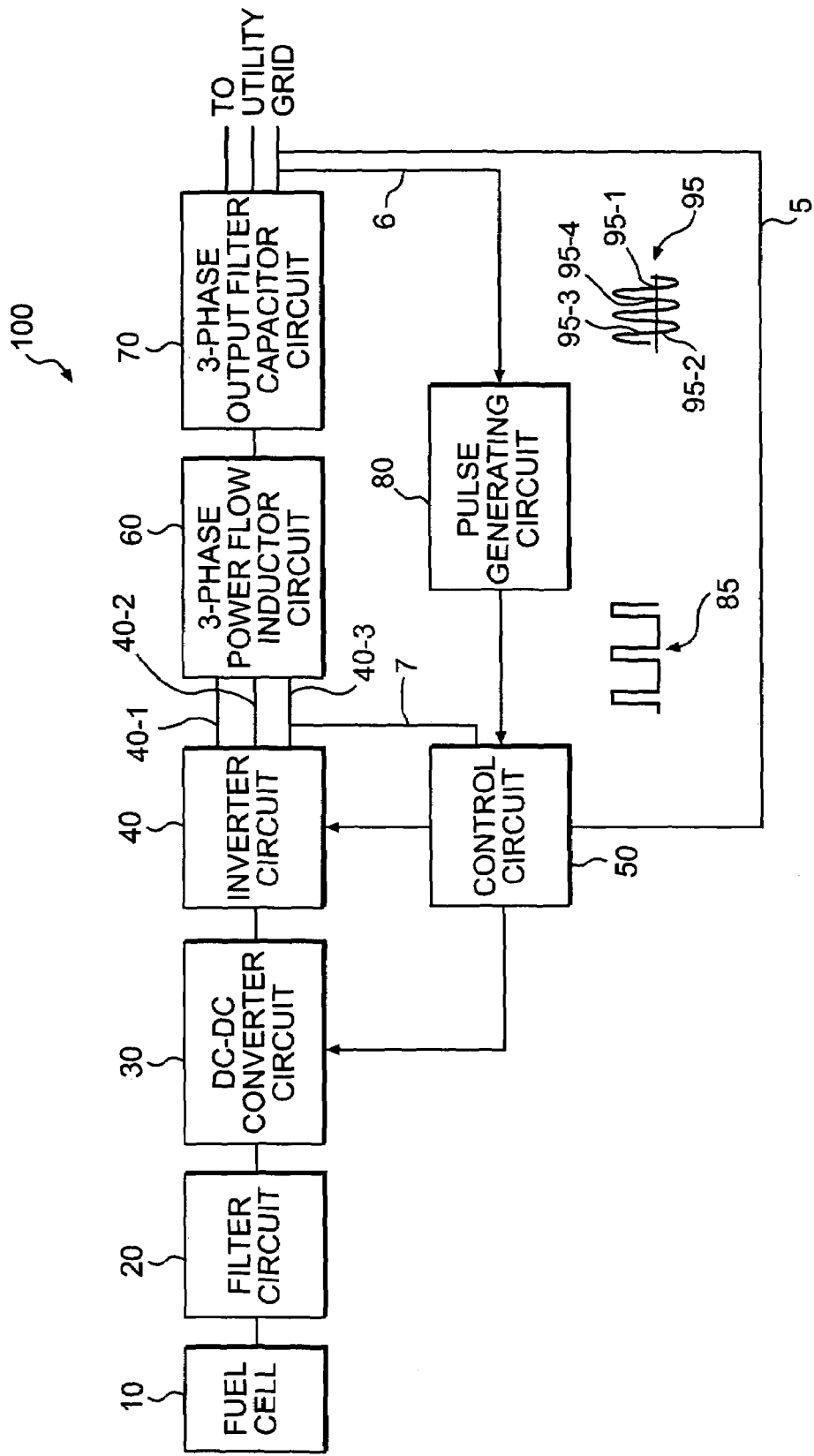
FIG. 1 illustrates a block diagram system for converting a DC signal to an AC signal consistent with an aspect of the present disclosure.

FIG. 1 illustrates a power conversion circuit 100 consistent with an aspect of the present disclosure. Fuel cell 10 may be a backup fuel cell for supplying auxiliary power to a utility grid. The output of fuel cell 10 is typically a high current, low voltage DC signal. The DC voltage is applied to a filter circuit 20, including a contactor 25 for selectively supplying the fuel cell output to conversion circuit 100. Filter circuit 20 is provided to smooth out any variations in the output of fuel cell 10.

DC-DC converter circuit 30 receives the filtered DC signal from filter 20, and converts the received low voltage signal to a higher voltage DC signal. The magnitude or level of the voltage output of DC-DC converter circuit 30 corresponds to an amplitude of the AC signal output from conversion circuit 100. The level of the DC voltage may be controlled in response to control signals output from control circuit 50, as discussed in greater detail below. Control circuit 50 can include a microprocessor, digital signal processor (DSP) or other suitable hardware and/or software combination.

Inverter circuit 40 receives the DC signal output from DC-DC converter circuit 30, and outputs an AC signal in response thereto. The AC signal may be three phase, so that three separate AC voltages are respectively output on lines 40-1, 40-2 and 40-3. Each AC voltage is output in response to further control signals output from control circuit 50, and supplied to a three phase power flow inductor circuit 60, which includes an inductor associated with each line 40-1 to 40-3. Each of inductors 60-1, 60-2, and 60-3 also constitutes part of a three phase output filter capacitor circuit 70, which is configured to smooth and remove distortions in the AC signal output from conversion circuit 100. The AC signal is then output to a utility power grid.

Utility generated AC signal ("utility AC signal") 95 is tapped from one phase of the utility power grid, and supplied to a pulse generating circuit 80. Utility AC signal 95 is a substantially sinusoidal voltage waveform, as generally understood and shown in FIG. 1. Utility AC signal 95 has an instantaneous voltage that changes with time. At points 95-1 and 95-3, the instantaneous voltage changes from a positive value to a negative value. At points 95-2 and 95-4, the "zero crossings", the instantaneous voltage of utility AC signal 95 changes from a negative value to a positive value. A pulse generating circuit 80 senses these zero crossings of utility AC signal 95, and typically outputs a pulse (see pulse signal 85) in response to each. The pulses are fed to the control circuit 50, which outputs appropriate control signals to inverter circuit 40 in response thereto. Pulse signal 85 is used by control circuit 50 to synchronize the output AC signal with utility AC signal 95, as well as the phase of the output AC signal relative to the utility AC signal 95, as discussed in greater detail below. Although pulse signal 85 output from circuit 80 is used to adjust the phase of the AC signal output from inverter circuit 40, pulse signal 85 can be used to adjust other parameters associated with the AC signal, such as timing and polarity.

Control circuit 50 can be configured to sense a current and/or voltage at the output of inverter circuit 40 on line 7. Line 6 carries a signal indicative of the AC utility voltage and output of circuit 70, and line 5 can be provided to supply a signal indicative of the voltage and/or current of the utility AC signal 95 to control circuit 50.

Figure 2:
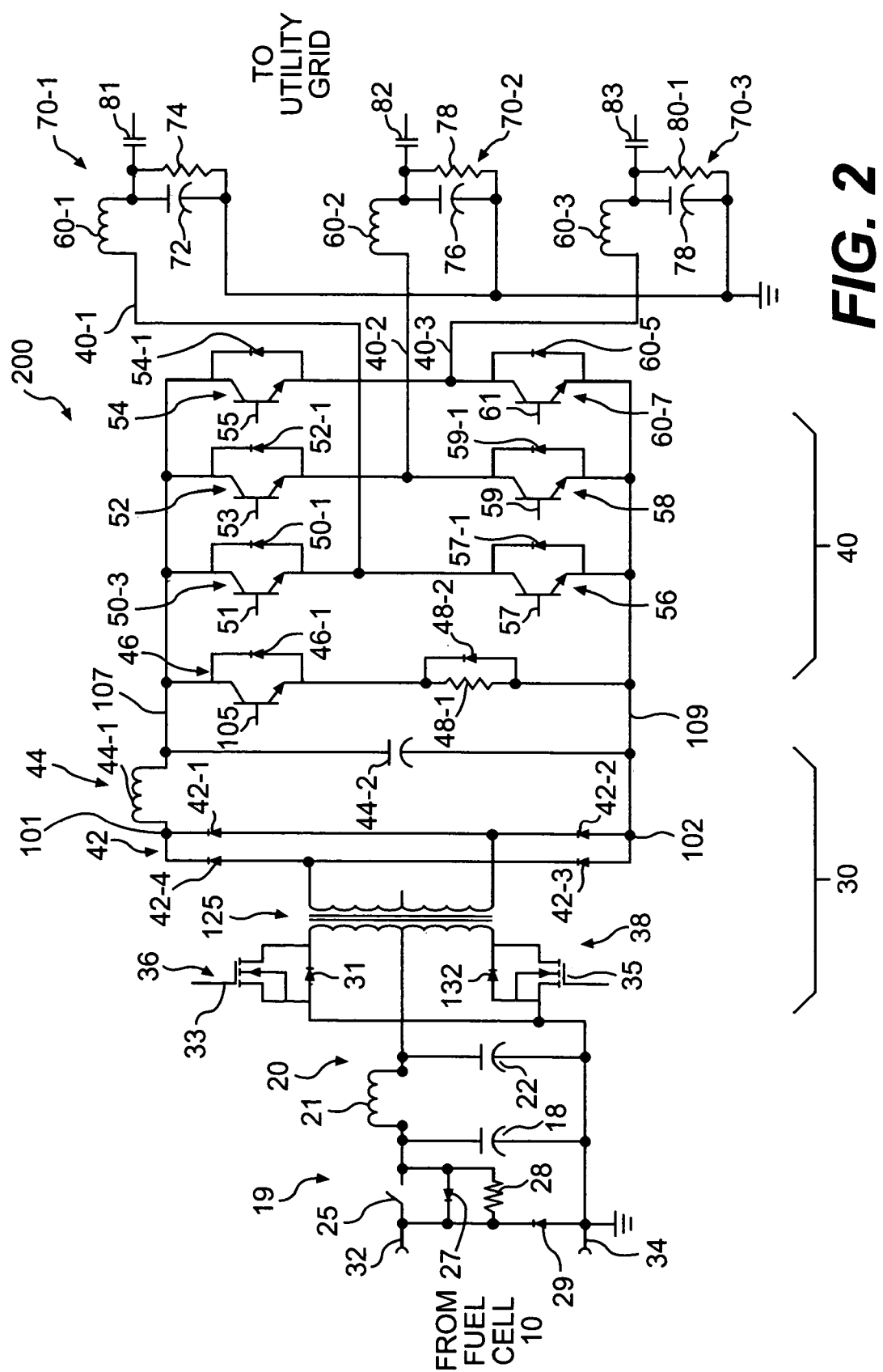
FIG. 2 is a detailed circuit schematic diagram of the system shown in FIG. 1.

FIG. 2 illustrates conversion circuit 100 in greater detail. Conversion circuit 100 includes an input section 19 including terminals 32 and 34, across which the input fuel cell DC voltage is applied. Input section 19 includes contactor 25 connected in parallel with a diode 27 and precharge resistor 28. An additional diode 29 is connected to electrically isolate terminal 32 from terminal 34. When the fuel cell DC voltage is initially applied across terminals 32 and 34, contactor 25 stays open to protect components in conversion circuit 100 from potential current surges. Accordingly, a capacitor 18 charges through the precharge resistor 28 with an RC time constant substantially equal to the product of the resistance of resistor 28 and the capacitance of capacitor 18. Once the voltage across capacitor 18 reaches a predetermined threshold value, e.g., 50 V, contactor 25 closes, thus bypassing resistor 28 so that capacitor 18 continues to charge up to the full fuel cell DC input voltage, but with a time constant based upon the capacitance of a filter capacitor 22, fuel cell output resistance, and line and connection parasitic resistances.

The higher the predetermined threshold voltage, the more time is required before contactor 25 closes. However, less current is required to fully charge capacitor 18 once the threshold is reached. In addition, a peak current surge during such charging is reduced.

In order to disconnect conversion circuit 100 from fuel cell 10, contactor 25 is opened, and diode 27 acts as a short across resistor 28, thereby reducing the time required to discharge capacitor 18.

When contactor 25 is closed, however, the fuel cell DC voltage is applied to filter circuit 20 including an inductor 21 and capacitor 22. Filter circuit 20 is provided to substantially eliminate variations in the fuel cell DC voltage so that a substantially smoothed DC voltage signal is applied to DC-DC converter circuit 30.

DC-DC converter 30 circuit includes transistors 36 and 38 configured in a conventional "push-pull" configuration with transformer circuit portion 125. Diodes 31 and 132 are connected in parallel with transistors 36 and 38 to assure proper current flow to transformer 125. Typically, control circuit 50 applies control signals to gates 33 and 35 of transistors 36 and 38, respectively, so that one of these transistors is rendered conductive while the other is turned off. Thus, for example, when a relatively high control signal is applied to gate 33, transistor 36 is turned on, while a low control signal turns off transistor 38. As a result, current flows down (in FIG. 2) through the primary windings of transformer 125, and a positive voltage is output from transformer 125. When transistors 36 and 38 and turned off and on, respectively, however, current flows through the transformer windings in an opposite direction, thereby creating a negative voltage output from transformer 125.

Bridge circuit 42 includes diodes 42-1, 42-2, 42-3 and 42-4 to rectify the output of transformer circuit 125 in a known manner. Filter 44, including inductor 44-1 and capacitor 44-2, is further provided to output a substantially constant DC voltage across capacitor 44-2 by averaging pulsed voltages generated across points 101 and 102 of bridge circuit 42. Typically, DC-DC converter circuit 30 maintains rail 107 at a positive potential +Vdc, and rail 109 is maintained at a minus potential −Vdc.

Operation of DC-DC converter circuit 30 will next be described with reference to FIGS. 10A and 10B, which are exemplary timing diagrams of signals VGATE33, VGATE35, VRECT and V0. VGATE33 and VGATE35 correspond to control signals applied to the gates 33 and 35, respectively. VRECT is the voltage output across points 101 and 102 of bridge circuit 42, and V0 is the voltage across capacitor 44-2, i.e., the voltage applied as an input to inverter circuit 40.

Figure 10A:
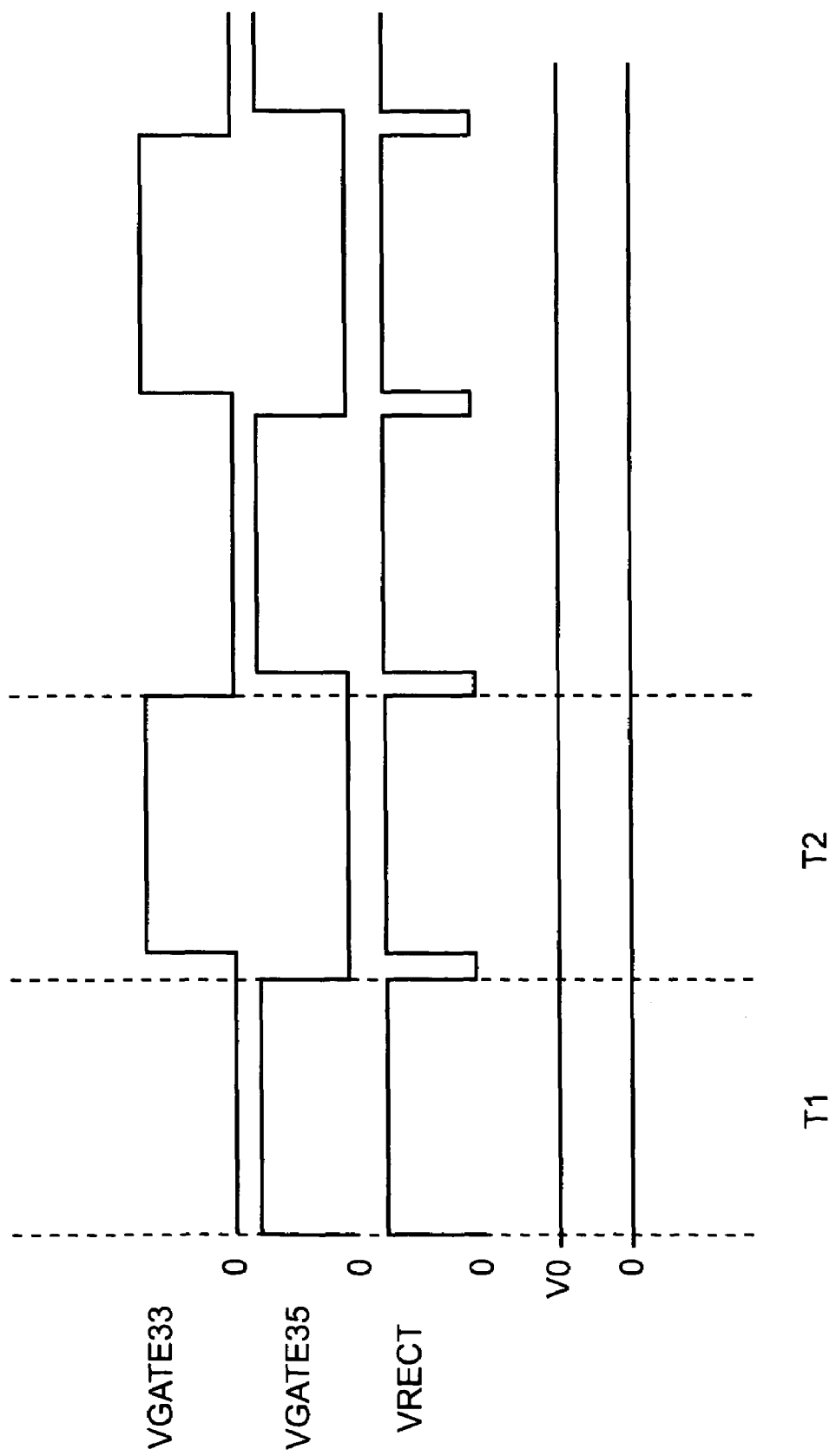

In FIG. 10A, during time period T1, VGATE33 is relatively low, while VGATE35 is at a relatively high potential.

In time period T2, however, VGATE35 is high, while VGATE33 is high. Thus, during substantially all of either time period T1 or time period T2, either one of VGATE33 or VGATE35 is at a high level, and control signals VGATE33 and VGATE35 have a 100% duty cycle. As a result, current flows through the windings of transformer 125 in a first direction during time period T1 and a second direction during time period T2, and VRECT is at a relatively high voltage for substantially both time periods T1 and T2. Filter 44 averages VRECT during time periods T1 and T2 so that the resultant output voltage is at a maximum value, V0.

In FIG. 10B, VGATE35 is high for only about half of the duration of time period T1, and VGATE33 is high for substantially half of time period T2. Accordingly, VGATE35 and VGATE33 have a 50% duty cycle in this case, and VRECT is at a relatively high voltage for half of time periods T1 and T2. As a result, when averaged by filter 44, the voltage applied to the input to inverter 40 is ½V0, or half of that associated with the 100% duty cycle discussed above. Accordingly, by adjusting the duty cycle of control signals applied to gates 33 and 35, for example, the voltage level applied to inverter circuit 40 can be changed.

Returning to FIG. 2, inverter circuit 40 will next be described. Inverter circuit 40 includes a plurality of switching elements, for example, transistors 46, 50-3, 52, 54, 56, 58 and 60-7. Diodes 46-1, 50-1, 52-1, 54-1, 57-1, 59-1 and 60-5 are respectively coupled between the emitter and collector of each of transistors 46, 50-3, 52, 54, 56, 58 and 60-7. Diode 46-1, for example, provides an alternative current path to a path through transistor 46 in the event current does not flow through transistor 46, even though the transistor is turned on. Diodes 50-1, 52-1, 54-1, 57-1, 59-1 and 60-5 likewise provide alternate current paths bypassing transistors 50-3, 52, 54, 56, 58 and 60-7, respectively. Diode 48-2 is included in order to provide a low resistance path in parallel to resistor 48-1 in the event the potential on rail 109 is higher than the potential at a point between resistor 48-1 and transistor 46.

Transistor 46 and resistor 48-1 and diode 48-2 constitute a leg of inverter circuit 40 to facilitate "resistive grid" mode operation of the inverter circuit 40. In resistive grid mode, a DC voltage can be output from a connection between transistor 46 and resistor 48-1. The resistive grid DC voltage can be used to independently test DC-DC converter circuit 30 and operation of conversion circuit 100 as a DC power source, such as when evaluating fuel cell durability. Alternatively, resistive grid mode can be employed when no utility connection is available.

During resistive grid mode, control signals output from control circuit 50 are supplied to bases 51, 53, 55, 57, 59 and 61 of transistors 50-3, 52, 54, 56, 58 and 60-7, respectively, to turn off and render each of these transistors non-conductive. A relatively high potential is supplied to base 105 to turn on transistor 46. Current therefore flows through transistor 46 and resistor 48-1 to −,Vdc rail 109. The potential drop across resistor 48-1 can then be measured for evaluation purposes, for example, as noted above.

Alternatively, inverter 40 can operate in a "utility interactive mode" in which control signals output from control circuit are used to drive each of bases 51, 53, 55, 59 and 61, while transistor 46 is turned off and non-conductive. Transistors 50-3 and 56 constitute one leg of inverter circuit 40 coupled to line 40-1, and are controlled through application of appropriate control signals to bases 51 and 57, respectively. Transistors 50-3 and 56 are configured to supply varying amounts of current to line 40-1 so that an alternating current/voltage signal is output on line 40-1, as discussed in greater detail below. The control signals are output from control circuit 50 to generate one phase of a three phase AC signal on line 40-1. Similarly, transistors 52 and 58 constitute a second leg for outputting a second phase signal of the AC signal on line 40-2 in response to further control signals applied to bases 53 and 59, respectively, and transistors 54 and 60-7 form a third leg of inverter circuit 40 for outputting the third phase on line 40-3 in accordance with additional control signals applied to corresponding bases 55 and 61.

Each line 40-1, 40-2 and 40-3 is coupled to a corresponding one of inductors 60-1, 60-2 and 60-3. Each inductor serves to regulate power flow associated with each of AC phase signal carried by lines 40-1, 40-2 and 40-3. In addition, inductors 60-1, 60-2 and 60-3 constitute part of filtering circuits 70-1, 70-2 and 70-3. As further shown in FIG. 2, each filtering circuit further includes capacitors and a resistor. For example, filtering circuit 70-1 includes capacitors 72 and 81, filtering circuit 70-2 includes capacitors 76 and 82, and filtering circuit 70-3 includes capacitors 78 and 83. In addition, filtering circuits 70-1, 70-2 and 70-3 include respective resistors 74, 78 and 80-1. Filtering circuits 70-1, 70-2 and 70-3 are configured to output a substantially distortion-free AC voltage wave form to the utility power grid in a known manner.

Figure 3:
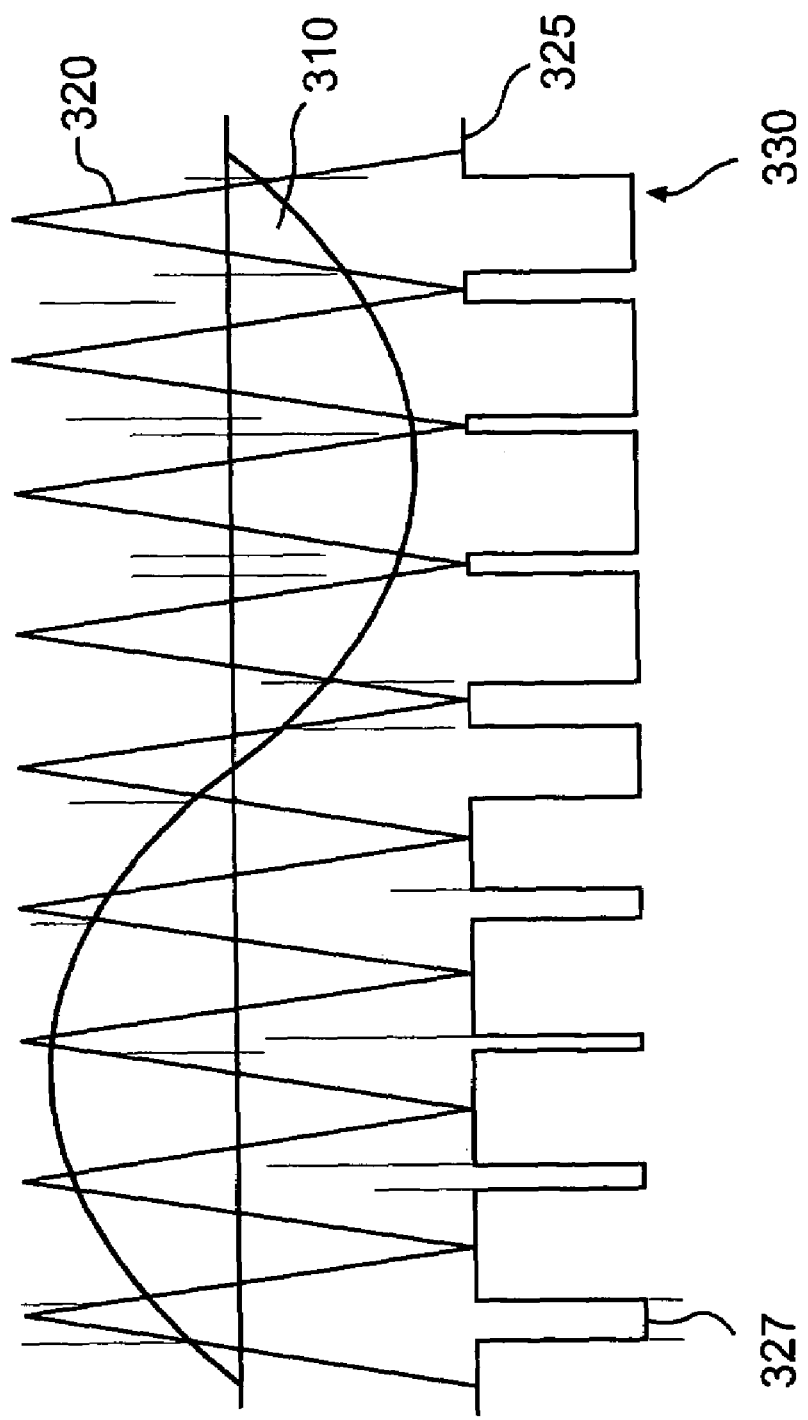
FIG. 3 illustrates various waveforms consistent with an aspect of the present disclosure.

Control signal generation will next be described with reference to FIGS. 3-5. Control signals supplied to bases 51, 53, 55, 57, 59 and 61 are typically pulse width modulated (PWM) signals generated by a so-called "triangle PWM" technique carried out by control circuit 50. In particular, as shown in FIG. 3, control circuit 50 determines a temporal function, which in this example, is a sinusoid waveform representation or control sine wave shown as curve 310, and a triangular waveform representation, graphically shown as curve 320, superimposed on sinusoid waveform representation 310. For those portions of triangle waveform 320 exceeding sinusoid waveform 310, a relatively low potential level 327 is output, and for portions of triangle waveform 320 less than or beneath sinusoid waveform representation 310, a relatively high voltage 325 is output. Accordingly, as further shown in FIG. 3, a series of variable width pulses or PWM pulses are generated. Typically, a unique series of such pulses is supplied to each of bases 51 and 57, to thereby selectively turn on and off transistors 50-3 and 56 in a first leg of inverter circuit 40 to thereby generate an AC signal, which in this instance is a first phase of a three phase AC signal. Other PWM signals are supplied to bases 53 and 59, as well as bases 55 and 61, to thereby output second and third AC phase signals from second and third legs of inverter circuit 40, respectively. Line 40-2 carries the second phase, for example, and the third phase of the AC signal can be output on line 40-3.

Figure 4:
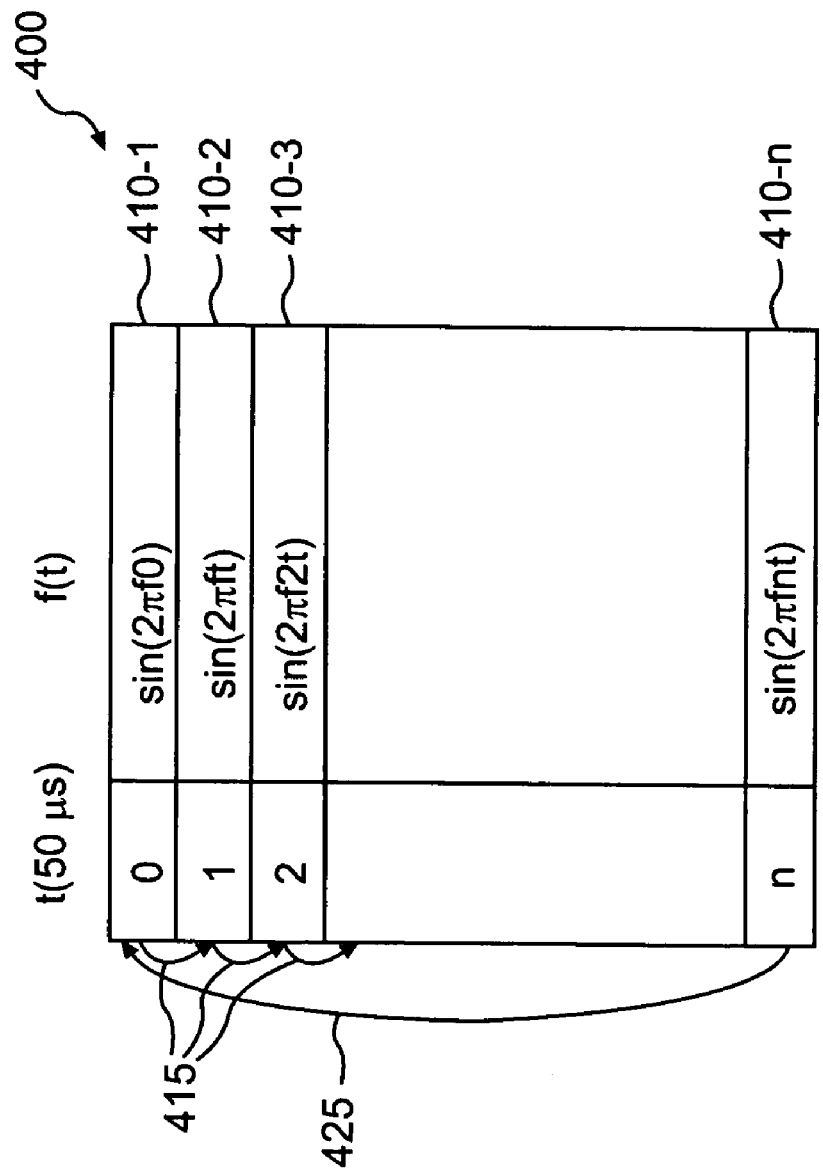
FIG. 4 illustrates a table storing information used in connection with the waveforms shown in FIG. 3.
Figure 5:
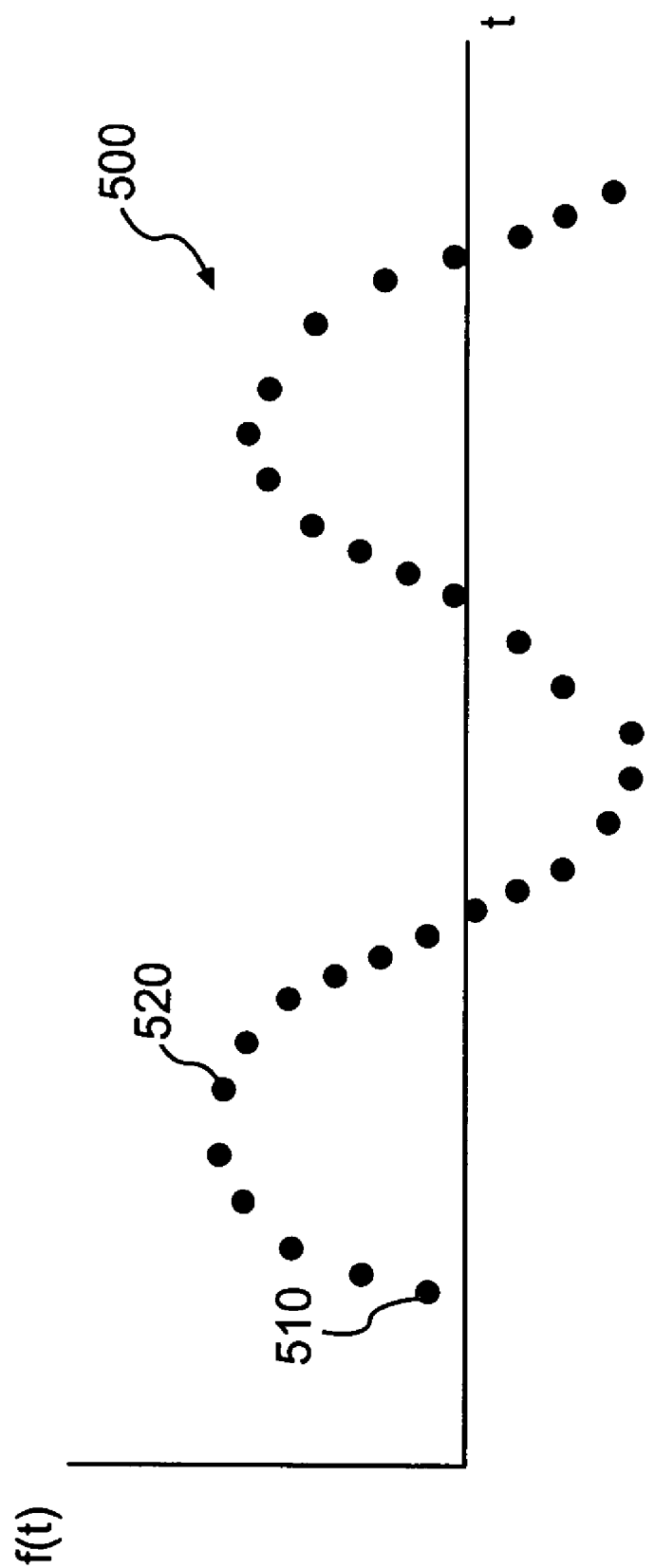
FIG. 5 illustrates a series of points associated with a waveform shown in FIG. 3.
Figure 6:
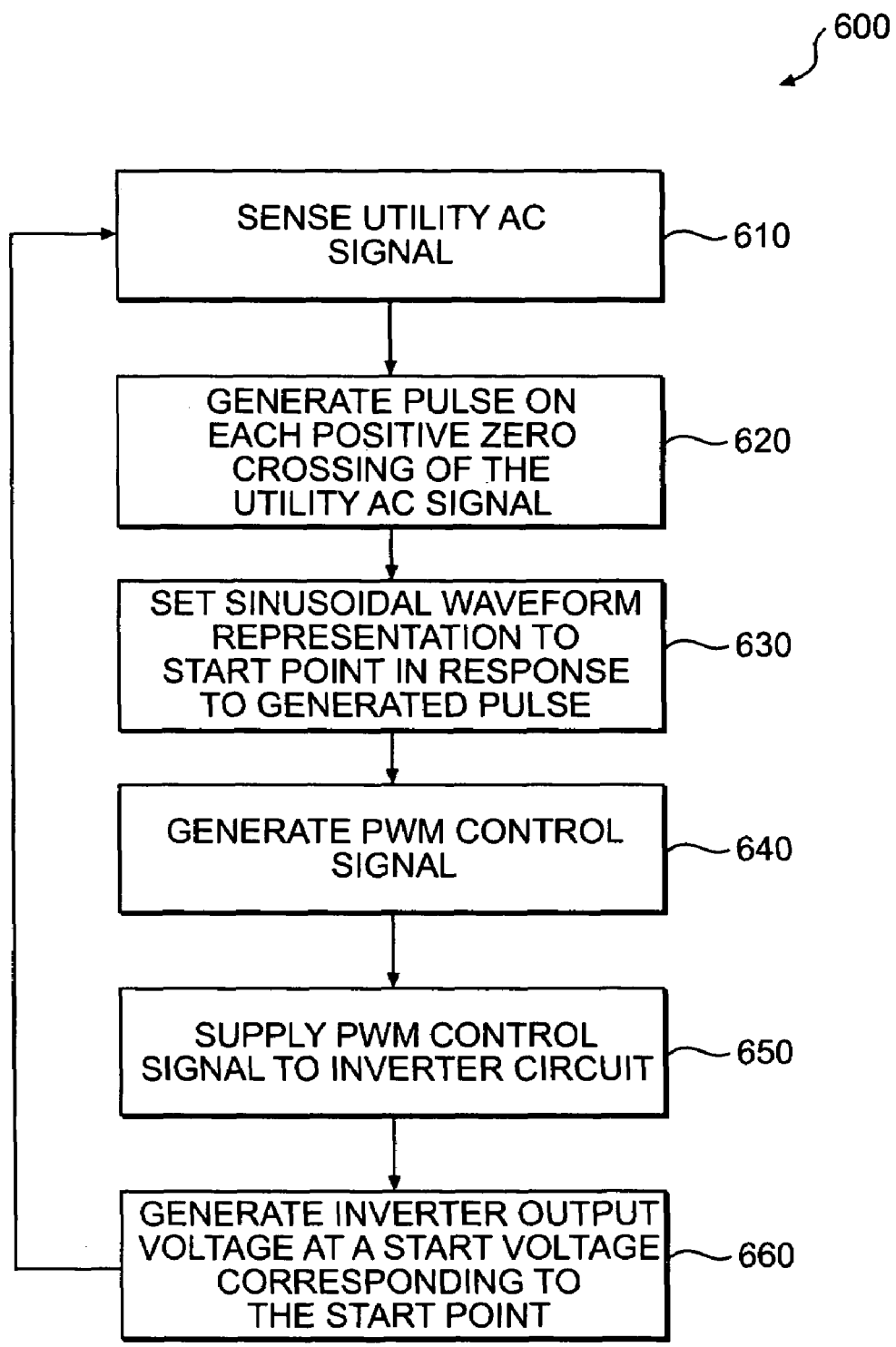
FIG. 6 illustrates a flowchart outlining steps of a method consistent with an aspect of the present disclosure.

Sinusoid waveform representation 310 is generated from information stored in a memory, typically look up table 400 in control circuit 50 and shown in FIG. 4. In the present example, table 400 includes rows 410-1 to 410-n, each of which stores a time value in 50 microsecond increments, and a corresponding temporal function, such as sine function value f(t), where f(t) is equal to sin(2πft). Control circuit 50 is configured to sequentially read each sine function value at 50 microsecond intervals, as indicated by arrows 415 in FIG. 4. Once the last row of table 400 is reached, control circuit 50 cycles back (arrow 425) to the first row 410-1 or start point in this instance, and sequentially reads out remaining sine function values as before. As a result, a series of points 500 of sinusoid waveform representation 310 are obtained as shown in FIG. 5, and the waveform is repeated with each cycle through table 400. Accordingly, PWM control signals 330 are continuously generated to maintain a constant AC signal output from inverter circuit 40.

Figure 11:
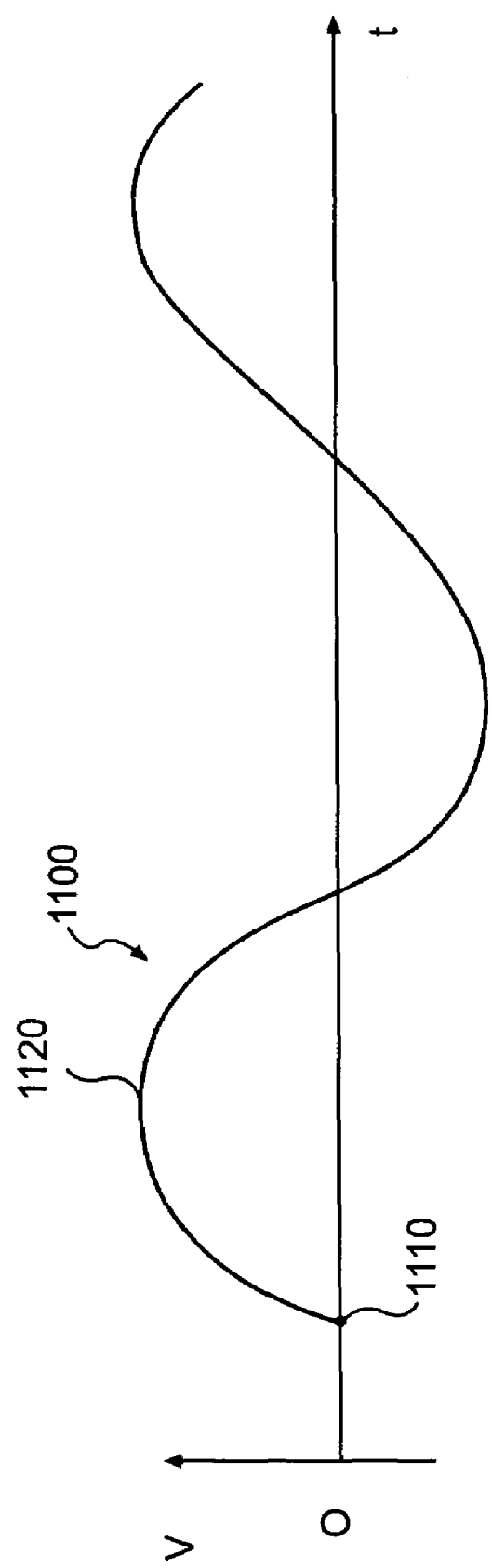
FIG. 11 illustrates an AC signal consistent with an additional aspect of the present disclosure.

By way of further example, the start point of sinusoidal waveform representation 310 corresponds to the row which begins the read out cycle of table 400 discussed above. In FIG. 5, the start point can be point 510, at which particular PWM signals are supplied to the transistors of inverter circuit 40 to start the output AC signal at an instantaneous voltage corresponding to a particular start voltage. As shown in FIG. 11, this start voltage can be a 0 volt start voltage 1110, from which the rest of AC signal 1100 propagates in time, i.e., AC signal 1100 conforms to a temporal function, which in this instance is substantially sinusoidal. Other start points, and start voltages can be set by control circuit 50, however. For example, the start point can be set to point 520 associated with a different row in table 400, to thereby obtain a corresponding start voltage 1120 in FIG. 11. In this case, control circuit 50 sequentially reads sine function values from table 400, but begins each read out cycle from the new starting point. Accordingly, by adjusting the start point of the read out cycle of table 400, and thus the start voltage of the output AC signal, the phase of the AC signal output from inverter circuit 40 can be controlled.

Consistent with a further aspect of the present disclosure, conversion circuit 100 can be operated in a utility interactive mode whereby a desired root mean square (rms) of the output AC signal from inverter circuit 40 and phase difference or power angle between the output AC signal and the utility AC signal can be obtained. Methods of operation of inverter circuit 40 will next be described with reference to FIGS. 6-9. For simplicity, the following discussion will be in reference to one phase of the AC output. It is understood that other AC phases can be controlled in a similar fashion.

By way of background, AC signals typically oscillate about some mean value, which is referred to as the "real" power of the signal. Real power is that which can be utilized by a user. If the mean value is zero, then all of the power being transmitted is called "reactive" power. Reactive power is typically stored in the inductance and capacitance of a system and cannot be utilized. Thus, real power is typically maximized with zero reactive power. In some instances, however, a combination of real and reactive power may be desired.

Real and reactive power are defined as follows:

$$P_\phi = \frac{1}{X}(V_1 V_2 \sin\delta) \text{ [W]} \quad (1)$$

$$Q_\phi = \frac{1}{X}(V_1 V_2 \cos\delta - V_2^2) \text{ [VAR]} \quad (2)$$

where $P_\phi$=per phase real power in watts (W)

$Q_\phi$=per phase reactive power in volt-amps reactive (VAR)

X=per phase inductive reactance of the power flow control inductor 60-1, 60-2, 60-3 (output filter inductor)

$V_1$=root mean square (rms) of the fundamental of the inverter output phase voltage (inverter output phase voltage)

$V_2$=rms of the utility phase voltage (assumed sinusoidal)

Figure 8:
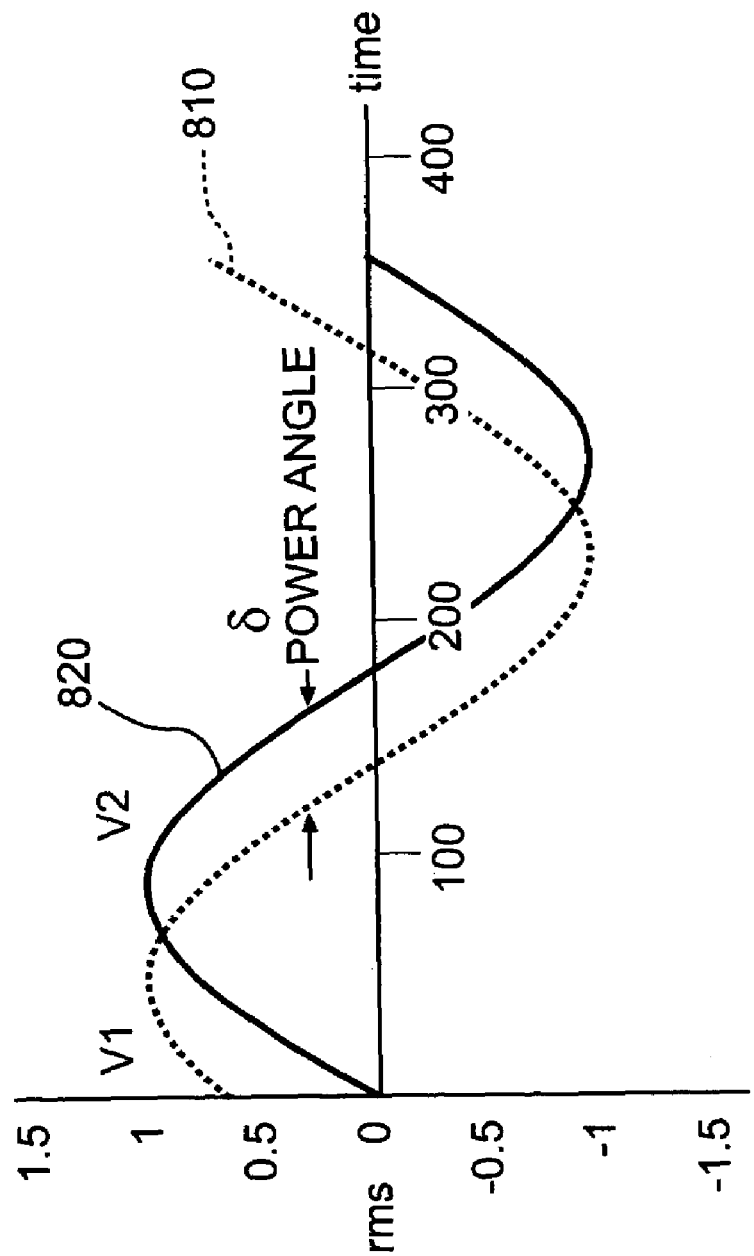
FIG. 8 illustrates an AC signal consistent with an additional aspect of the present disclosure.

As shown in FIG. 8, d is a power angle or a phase difference between the utility AC signal 820 and the AC signal output from inverter circuit 810. In order to reduce reactive power Q to zero, the inverter output voltage can be varied as the power angle d. In light of the above formulas and assuming a result of zero reactive power, therefore:

$$V_1 V_2 \cos\delta = V_2^2 \quad (3)$$

$$V_1 = V_2/\cos\delta \quad (4)$$

V2 is generally fixed by the utility, and the value of d (power angle) is typically based upon a current command input to control circuit 50 and represents an amount of current to be drawn from fuel cell 10. Accordingly, by adjusting the start point of the memory read out cycle (see FIG. 4), and thus the AC signal start voltages, as discussed above, the desired power angle can be achieved. In addition, V1 can be controlled based on the output of DC-DC converter circuit 30 supplied to inverter circuit 40. Thus, the power angle and V1 can be set to satisfy the above equation to yield substantially zero reactive power.

In more detail, the AC signal output from conversion circuit 100 is typically first synchronized, followed by power angle and V1 adjustment in order to minimize reactive power. A method for synchronizing the inverter output AC with the utility AC signal will next be described in connection with flow chart 600 shown in FIG. 6.

The utility AC signal voltage oscillates about zero volts. During a positive zero crossing of the AC utility voltage, the instantaneous voltage of the signal changes from a negative value to a positive value. In step 610, the utility AC signal is sensed by pulse generating circuit 80, and in step 620 a pulse is generated by pulse generating circuit 80 in response to each positive zero crossing of the utility AC signal. The pulse is supplied to control circuit 50, which sets the start point of the sinusoid waveform representation 310 and the read out cycle from table 400 to coincide with the zero crossing of the utility AC signal (step 630).

Accordingly, the read out cycle from table 400 is set to begin at a start point that generates a PWM control signal (step 640) corresponding to a zero inverter output voltage. The PWM control signal is supplied to inverter circuit 40 (step 650), which, in turn, generates a zero start voltage corresponding to the start point stored in table 400 (step 660). As a result, the instantaneous voltage of the AC signal is adjusted or set to a zero start voltage. Accordingly, the AC signal output from inverter circuit 40 will thereafter cross zero each time the utility AC signal crosses zero, since both typically conform to temporal sinusoidal waveform function. The two AC signals are thus synchronized with a power angle of zero. Although the instantaneous voltage can be controlled or adjusted as noted above in response to the pulses output from pulse generating circuit 80, the pulses can be used to adjust other parameters associated with the output AC signal.

Once synchronization has been achieved, power angle and V1 adjustment can be performed in order to achieve either no reactive power, or some mix of real and reactive power. Power angle and V1 adjustment will next be described with reference to FIGS. 7 and 9, which illustrate flow charts 700 and 900 outlining methods for controlling the power angle and V1, respectively.

Figure 7:
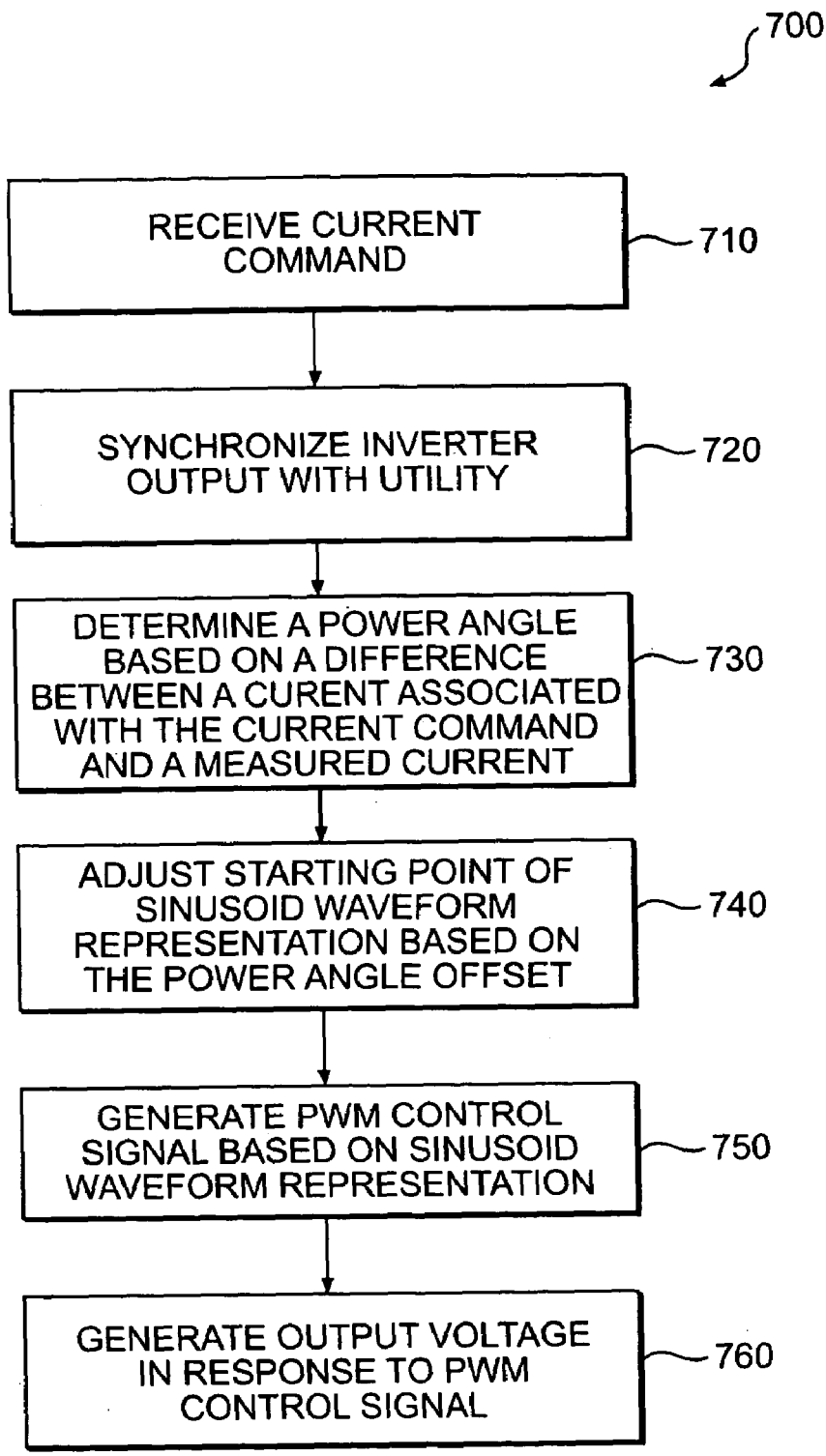
FIG. 7 illustrates a flowchart outlining steps of a method consistent with a further aspect of the present disclosure.

In FIG. 7, a current command is received by control circuit 50 which corresponds to an amount of current to be drawn by conversion circuit 100 (step 710), and the output of inverter circuit 40 is synchronized with the utility AC signal in step 720. In step 730, the power angle is determined based upon current command. For example, the current output from conversion circuit 100 is measured, an error value is determined by subtracting the measured current from the current value identified by the current command, and the error is multiplied by a gain factor to thereby obtain the power angle. Based on the power angle, the start point of the table 400 read out cycle, and thus the start point of the sinusoidal waveform representation 310 are adjusted accordingly (step 740). An appropriate PWM control signal in accordance with the new start point is generated (step 750), and a corresponding AC signal voltage is output in accordance with the PWM control signal (step 760).

As a result, the AC signal output from inverter circuit 40 (corresponding to curve 810) in FIG. 8 does not cross zero volts at the same instant as the utility AC signal (curve 820), but rather at a different crossing point shown FIG. 8. Thus, the AC signal output from the inverter circuit 40 is shifted relative to the utility AC signal. The amount of shift or phase difference between the two AC signals constitutes the power angle. Thus, by changing the start point of sinusoid waveform representation 310, as discussed above, the AC signal output from inverter circuit 40 can be effectively shifted to obtain the desired power angle.

Figure 9:
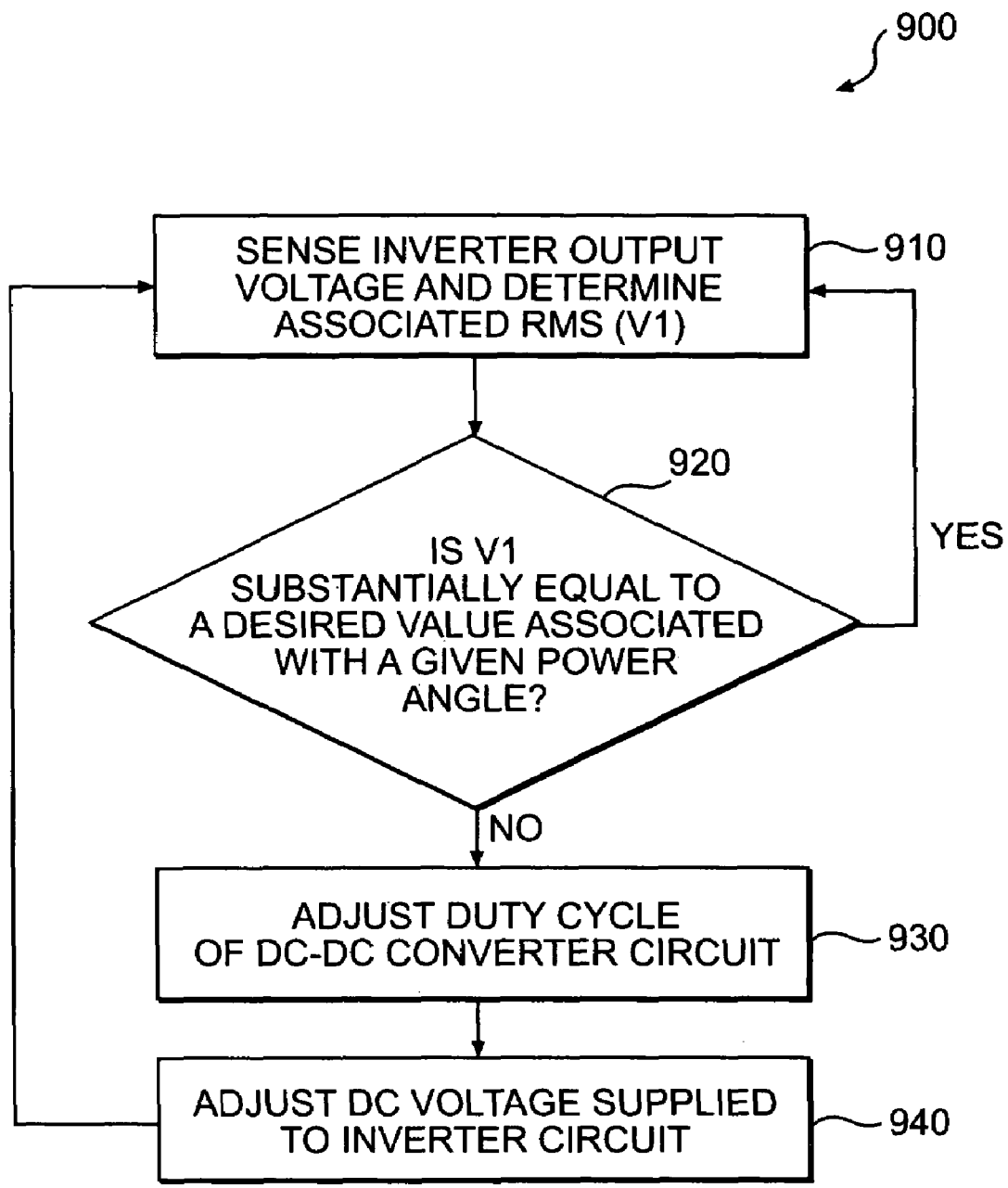
FIG. 9 illustrates a flowchart outlining steps of a method consistent with yet a further aspect of the present disclosure.

Turning to FIG. 9, flowchart 900 outlines a circuit for adjusting V1 consistent with a further aspect of the present disclosure. In step 910, the output voltage at the output of inverter circuit 40 is sensed and the corresponding root mean square (rms) value (V1) is calculated. A determination is then made as to whether the sensed V1 is substantially equal to a desired value associated with a given power angle (step 920). If yes, a further rms value of the inverter output is sensed and the method returns to step 910. If not, control circuit 50 adjusts the duty cycle of control signals supplied to DC-DC converter circuit 30 (step 930) to change the level of the DC input voltage to inverter circuit 40 in a manner similar to that described above in connection with FIGS. 10A and 10B (step 940). The adjusted DC voltage is supplied to inverter circuit 40 (step 940) and a further V1 value is sensed as the method returns to step 910.

V1 is related to the level of the DC output from DC-DC converter circuit 30 supplied to inverter circuit 40. Thus, by changing the DC-DC converter circuit output through duty cycle adjustment, V1 can be changed to a desired value satisfying the above described relationship between V1, V2 and the power angle, to thereby yield a desired reactive power.

It is noted that V1 can also be controlled, for example, by adjusting a modulation index associated with sinusoidal waveform representation 310. The modulation index is related to amplitude of the sinusoidal waveform representation 310, and by reducing such amplitude or modulation index, V1 can correspondingly be reduced. However, when the modulation index is lowered, the output PWM control signals from control circuit 50 are more susceptible to distortions and noise. Accordingly, consistent with a further aspect of the present disclosure, V1 is adjusted through control of the output of DC-DC converter circuit 30, while the modulation index of sinusoidal waveform representation 310 is maintained at a maximum value substantially equal to 1. The resulting PWM control signals are, therefore, relatively distortion free so that a desired AC signal can be output from inverter circuit 40.

INDUSTRIAL APPLICABILITY

Consistent with an aspect of the present disclosure, a backup fuel cell, for example, is coupled to a utility power grid, through a power conversion circuit. The fuel cell outputs a DC signal to the conversion circuit, which, in turn, outputs an AC signal in response thereto. Typically, the AC signal is continuously supplied to the utility power grid, even if the grid is operational. In order to optimize performance of the conversion circuit, a control circuit adjusts the root means square (rms) and phase or power angle of the AC signal relative to a utility generated AC signal based upon the output of the conversion circuit and a current command input to the control circuit. The rms and phase parameters are maintained by monitoring the output of the conversion circuit. In addition, the control circuit is configured to synchronize the output AC signal to the utility AC signal by resetting the AC signal to a start point with each zero-crossing of the utility AC signal. Further, a single output inductor is provided for both filtering and power flow control of the output AC signal.

The present disclosure, as described above, can reduce the amount of reactive power supplied by a conversion circuit to a zero value through synchronization and control of the relative phase of the output AC signal and the level of the DC voltage input to inverter circuit 40. These parameters can be adjusted to obtain varying amounts of reactive and real power, as needed.

Moreover, the synchronization scheme described above allows the AC signal output from inverter circuit 40 to track the utility AC signal based on the positive zero crossings of the utility AC signal. Thus, the output AC signal can maintain its sine wave shape and continue to be synchronized with the utility AC signal, even if temporary variations or discontinuities occur in the utility AC signal.

In addition, inductors 60-1 to 60-3 provide both power flow control and serve as part of output filtering circuits 70-1 to 70-3, respectively (see FIG. 2). Accordingly, conversion circuit 100 discussed above has a relatively simple construction. Also, although the present disclosure describes coupling the conversion circuit to a fuel cell, batteries or other sources of DC power can be connected as well.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A power conversion circuit, comprising:
   an inverter circuit configured to receive a DC signal and output a first AC signal;
   a pulse generating circuit configured to receive a utility generated AC signal and generate pulse signals in response to changes in a parameter associated with the utility generated AC signal, the utility generated AC signal being a second AC signal, the first AC signal having substantially the same frequency as the second AC signal; and
   a control circuit coupled to said inverter circuit, said control circuit being configured to receive the pulse signals and supply control signals to the inverter circuit such that an instantaneous voltage of the first AC signal is repeatedly reset to a predetermined voltage in response to each of the pulse signals.

2. A power conversion circuit in accordance with claim 1, wherein the parameter of said second AC signal is a value of an instantaneous voltage of the second AC signal.

3. A power conversion circuit in accordance with claim 2, wherein the change is a change from a negative value of the instantaneous voltage of the second AC signal to a positive value of the instantaneous voltage of the second AC signal.

4. A power conversion circuit in accordance with claim 3, wherein the first AC signal conforms to a temporal function having a start point, the instantaneous voltage of the first AC signal being set to a voltage associated with the start point in response to the change in the parameter of the second AC signal.

5. A power conversion circuit in accordance with claim 1, wherein said control signal includes a pulse width modulated signal.

6. A power conversion circuit in accordance with claim 1, wherein the DC signal is a first DC signal, the power conversion circuit further comprising a DC-DC converter circuit, the DC-DC converter circuit being configured to receive a second DC signal, and output the first DC signal.

7. A power conversion circuit in accordance with claim 6, wherein the control signals are first control signals, control circuit being configured to supply second control signals to the DC-DC converter circuit to thereby adjust a level of the first DC signal.

8. A power conversion circuit in accordance with claim 7, wherein the level of said first DC signal is in accordance with a duty cycle associated with the DC-DC converter, the duty cycle being based on the second control signals.

9. A power conversion circuit in accordance with claim 6, further including a filter circuit, the filter circuit being configured to receive a third DC signal, and output the second DC signal.

10. A power conversion circuit in accordance with claim 9, wherein the third DC signal is output from a fuel cell.

11. A power conversion circuit in accordance with claim 1, further including an inductor circuit and a capacitor circuit, the inductor circuit being configured to control power flow associated with the first AC signal, and the inductor circuit and the capacitor circuit being configured to filter the first AC signal.

12. A method of controlling an AC signal, said AC signal being a first AC signal and being output from an inverter circuit, said method comprising:

identifying changes in a value of an instantaneous voltage associated with a utility generated AC signal, the utility generated AC signal being a second AC signal;

generating pulse signals in response to the changes in the value;

supplying control signals to the inverter circuit in response to the pulse signals to reset an instantaneous voltage of said first AC signal to a start voltage, wherein the first AC signal conforms to a temporal function having a start point, and the start voltage corresponds to the start point.

13. A method in accordance with claim 12, wherein the change in value is a change from a negative value of the instantaneous voltage of the second AC signal to a positive value of the instantaneous voltage of the second AC signal.

14. A method in accordance with claim 12, further including generating the first AC signal in response to information associated with a function stored in a memory.

15. A method in accordance with claim 14, wherein the information includes information associated with the start point, the setting of the instantaneous voltage of the first AC signal including generating the start voltage in response to the information associated with the start point.

16. A method in accordance with claim 15, wherein the first AC signal is output from an inverter circuit in response to a pulse width modulated (PWM) control signal, the setting of the instantaneous voltage further including supplying the PWM control signal to the inverter circuit to thereby perform the step of generating the start voltage.

17. A method in accordance with claim 14 wherein the information is associated with a sine wave.

\* \* \* \* \*